(12) United States Patent
Hidai

(10) Patent No.: US 6,914,469 B2
(45) Date of Patent: Jul. 5, 2005

(54) CLOCK DIVIDER CIRCUIT

(75) Inventor: Takashi Hidai, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/892,802

(22) Filed: Jul. 15, 2004

(65) Prior Publication Data

US 2004/0257138 A1 Dec. 23, 2004

Related U.S. Application Data

(62) Division of application No. 10/346,689, filed on Jan. 15, 2003, now Pat. No. 6,856,184.

(51) Int. Cl.[7] .................................................. G06F 1/04
(52) U.S. Cl. ........................ 327/291; 329/299; 329/115; 377/47; 377/48
(58) Field of Search ................................ 327/291, 299, 327/115, 117; 377/47, 48

(56) References Cited

U.S. PATENT DOCUMENTS

| | | | | | |
|---|---|---|---|---|---|
| 5,055,800 A | * | 10/1991 | Black et al. | ................. | 331/1 A |
| 5,287,296 A | * | 2/1994 | Bays et al. | ................. | 708/103 |
| 5,353,311 A | * | 10/1994 | Hirata et al. | ................. | 375/135 |
| 5,450,028 A | * | 9/1995 | Therssen | ................. | 327/91 |
| 5,682,605 A | * | 10/1997 | Salter | ................. | 375/145 |
| 6,456,164 B1 | * | 9/2002 | Fan | ................. | 331/16 |

* cited by examiner

Primary Examiner—Timothy P. Callahan
Assistant Examiner—An T. Luu

(57) ABSTRACT

A system that includes a first circuit configured generate a first set of encoded signals in response to a first clock signal and a second circuit configured to generate a second set of encoded signals in response to the first clock signal is provided. The system also includes a third circuit configured to generate a first pulse signal and a second pulse signal in response to the first set of encoded signals and the second set of encoded signals, and a fourth circuit configured to generate a second clock signal in response to the first pulse signal and the second pulse signal.

15 Claims, 7 Drawing Sheets

US 6,914,469 B2

CLOCK DIVIDER CIRCUIT

This is a Divisional of application Ser. No. 10/346,689, filed on Jan. 15, 2003, now U.S. Pat. No. 6,856,184, the entire disclosure of which is incorporated herein by reference.

THE FIELD OF THE INVENTION

The present invention generally relates to digital circuitry and, more particularly, to a clock divider circuit.

BACKGROUND OF THE INVENTION

Components in digital systems typically operate using a system clock. A system clock provides synchronization to digital circuits in the components to allow the circuits to generate and process information. At various times, different components in a digital system may use clock signals with different frequencies and/or duty cycles. Although multiple clocks may be included in a system to generate clock signals with different frequencies and/or duty cycles, multiple clocks in a system may add cost, complexity, or physical space to a design of the system. As a result, the use of multiple clocks to generate clock signals with different frequencies and/or duty cycles in a digital system may be undesirable.

Various analog or digital circuits may be used to alter the frequency or the duty cycle of a clock signal. These circuits, however, may not provide a clock signal that has a desired frequency and/or duty cycle for a particular digital system. For example, the circuits may not generate a divided clock signal with a 50% duty cycle where the divided clock signal has a frequency that is an odd fraction of the frequency of the system clock (e.g. $\frac{1}{3}$, $\frac{1}{5}$, $\frac{1}{7}$, etc.). In addition, these circuits may not be programmable such that the frequency of a clock signal may be changed at various times.

It would be desirable to be able to generate a clock signal that has a frequency that is a fraction of a frequency of another clock signal.

SUMMARY OF THE INVENTION

The present disclosure provides a system that includes a first circuit configured generate a first set of encoded signals in response to a first clock signal and a second circuit configured to generate a second set of encoded signals in response to the first clock signal. The system also includes a third circuit configured to generate a first pulse signal and a second pulse signal in response to the first set of encoded signals and the second set of encoded signals, and a fourth circuit configured to generate a second clock signal in response to the first pulse signal and the second pulse signal.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A clock divider circuit is described and illustrated herein. The clock divider circuit receives a first clock signal such as a system clock signal and generates a second clock signal using the first clock signal. The second clock signal has a duty cycle of 50% and a frequency that is (one divided by n) of the frequency of the first clock signal where n is an integer that is greater than or equal to one. In particular, n may be an odd integer such as 3, 5, or 7 to cause the frequency of the second clock signal to be $\frac{1}{3}$, $\frac{1}{5}$, or $\frac{1}{7}$, respectively, of the first clock signal. In certain embodiments, the clock divider circuit may be programmable such that the value of n may be changed over time.

The following Figures illustrate embodiments of the clock divider circuit using hardware logic elements. Other embodiments not shown herein may use software or a combination of hardware and software to perform one or more of the functions of the clock divider circuit.

Figure 1:
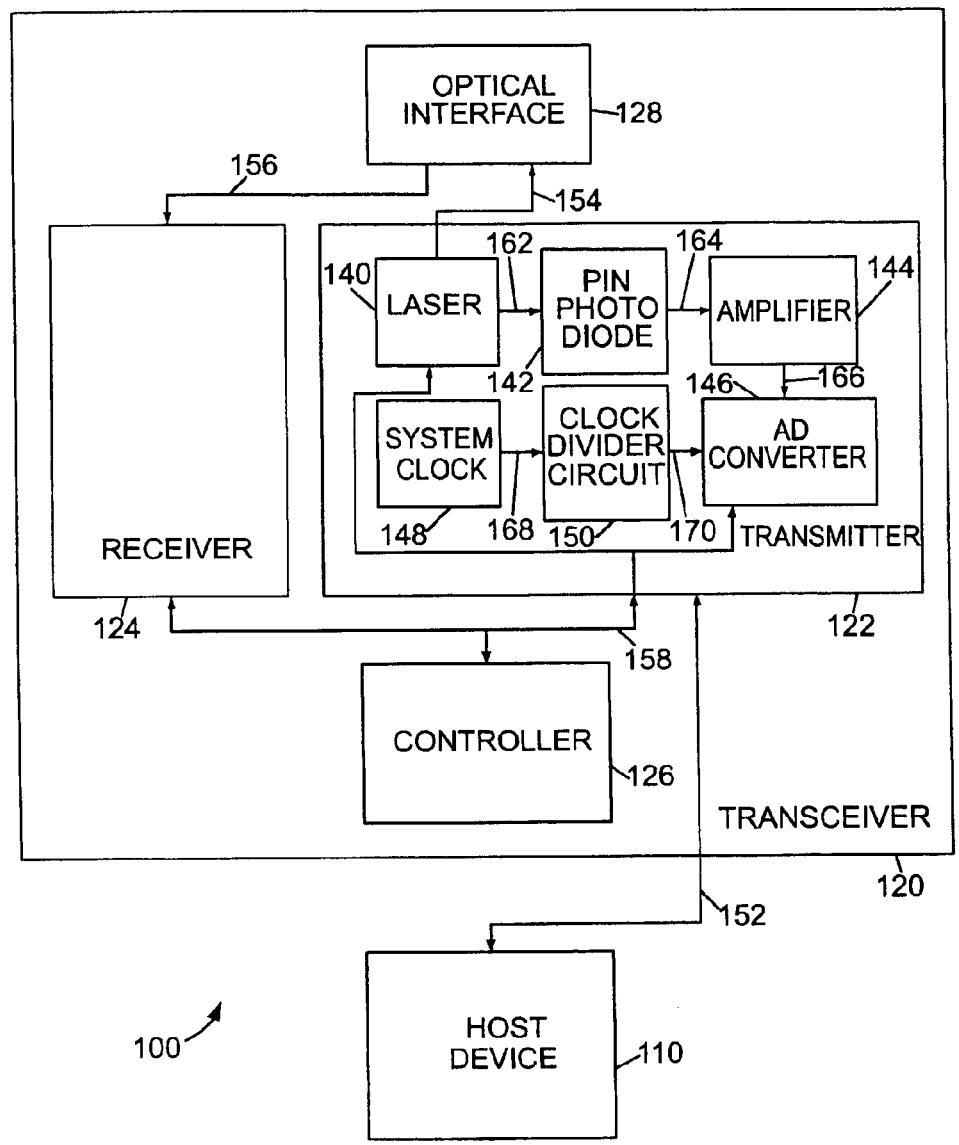
FIG. 1 is a block diagram illustrating an embodiment of a system that includes a clock divider circuit.

FIG. 1 is a block diagram illustrating an embodiment of a system 100 that includes a clock divider circuit 150. As shown, FIG. 1 includes a host device 110 coupled to a transceiver 120. Transceiver 120 includes a transmitter 122, a receiver 124, a controller 126, and an optical interface 128. Transmitter 122 includes a laser 140, a PIN photo diode 142, an amplifier 144, an analog-to-digital converter 146, a system clock 148, and clock divider circuit 150.

Host device 110 may be any type of wired or wireless device configured to operate in conjunction with transceiver 120. Examples of such devices include a server computer system, a personal computer system, a laptop computer system, a handheld computer system, a personal digital assistant, and a mobile telephone.

Transceiver 120 comprises an optical transceiver configured to communicate with host device 110 by sending and receiving digital signals using an electrical connection 152. Electrical connection 152 couples host device 110 to transmitter 122 and may be any suitable serial or parallel connection. One suitable connection would be an I2C connection, as provided by the I2C-Bus Specification available from Philips Semiconductors. Transceiver 120 also communicates with another device (not shown) by sending and receiving optical signals using optical interface 128. Optical interface 128 may be a Fibre Channel interface or another type of optical interface.

In one embodiment, transceiver 120 conforms to the SFF-8074i Specification for SFP (Small Form Factor Pluggable) Transceiver. The SFF-8074i Specification is available from http://www.sffcommittee.com or ftp://ftp.seagate.com/sff/. In other embodiments, transceiver 120 may conform to other specifications.

Transmitter 122 receives digital output signals from host 110 using a connection not shown in FIG. 1, converts the digital output signals into analog output signals using a digital-to-analog converter (not shown), and provides the analog output signals to laser 140. Laser 140 generates optical output signals in response to the analog output signals and provides the optical output signals to optical interface 128.

Receiver 124 receives optical input signals from optical interface 128 using a connection 156, converts the optical input signals to digital input signals using an analog-to-digital converter (not shown), and provides the digital input signals to host 110 using a connection not shown in FIG. 1.

Controller 126 provides control signals to and receives feedback signals from transmitter 122 and receiver 124 using a connection 158. Connection 158 may be any suitable serial or parallel connection. One suitable connection would be an I2C connection, as provided by the I2C-Bus Specification available from Philips Semiconductors. Controller 126 includes a microcontroller, firmware, and memory (not shown) for generating the control signals and receiving the feedback signals.

In operation, PIN photo diode 142 receives optical signals from laser 140 using a connection 162. PIN photo diode 142 converts the optical signals to analog signals and provides the analog signals to amplifier 144 using a connection 164. Amplifier 144 amplifies the analog signals and provides the amplified signals to analog-to-digital converter 146 using a connection 166. Analog-to-digital converter 146 comprises a sigma-delta modulator configured to convert the analog signals into digital signals and provide the digital signals to controller 126 using connection 158. In response to receiving the digital signals, controller 126 provides control signals to laser 140 using connection 158. PIN photo diode 142, amplifier 144, and/or analog-to-digital converter 146 comprise a monitoring circuit.

System clock 148 provides a system clock signal to clock divider circuit 150 using a connection 168. Clock divider circuit 150 receives the system clock signal and generates a divided clock signal using the system clock signal. Clock divider circuit 150 provides the divided clock signal to analog-to-digital converter 146 using a connection 170.

The divided clock signal has a frequency of (one divided by n) of the frequency of the system clock signal where n is an integer greater than or equal to one. n may be any integer greater than or equal to one including odd integers that are greater than one. In one particular embodiment, n is three such that the divided clock signal has a frequency that is one-third (⅓) of the frequency of the system clock signal.

In the embodiment of FIG. 1, clock divider circuit 150 is configured to generate the divided clock signal at a set frequency based on the frequency of the system clock. In other words, the n value is set to a particular value such as three and is not programmable. In another embodiment described below with reference to FIG. 7 below, the n value is programmable such that the clock divider circuit may generate a divided clock signal in response to various values of n at different times.

In the embodiment of FIG. 1, transmitter 122 includes system clock 148 and the clock circuit 150. In other embodiments, system clock 148 and the clock circuit 150 may be included in other parts of transceiver 120.

Figure 2:
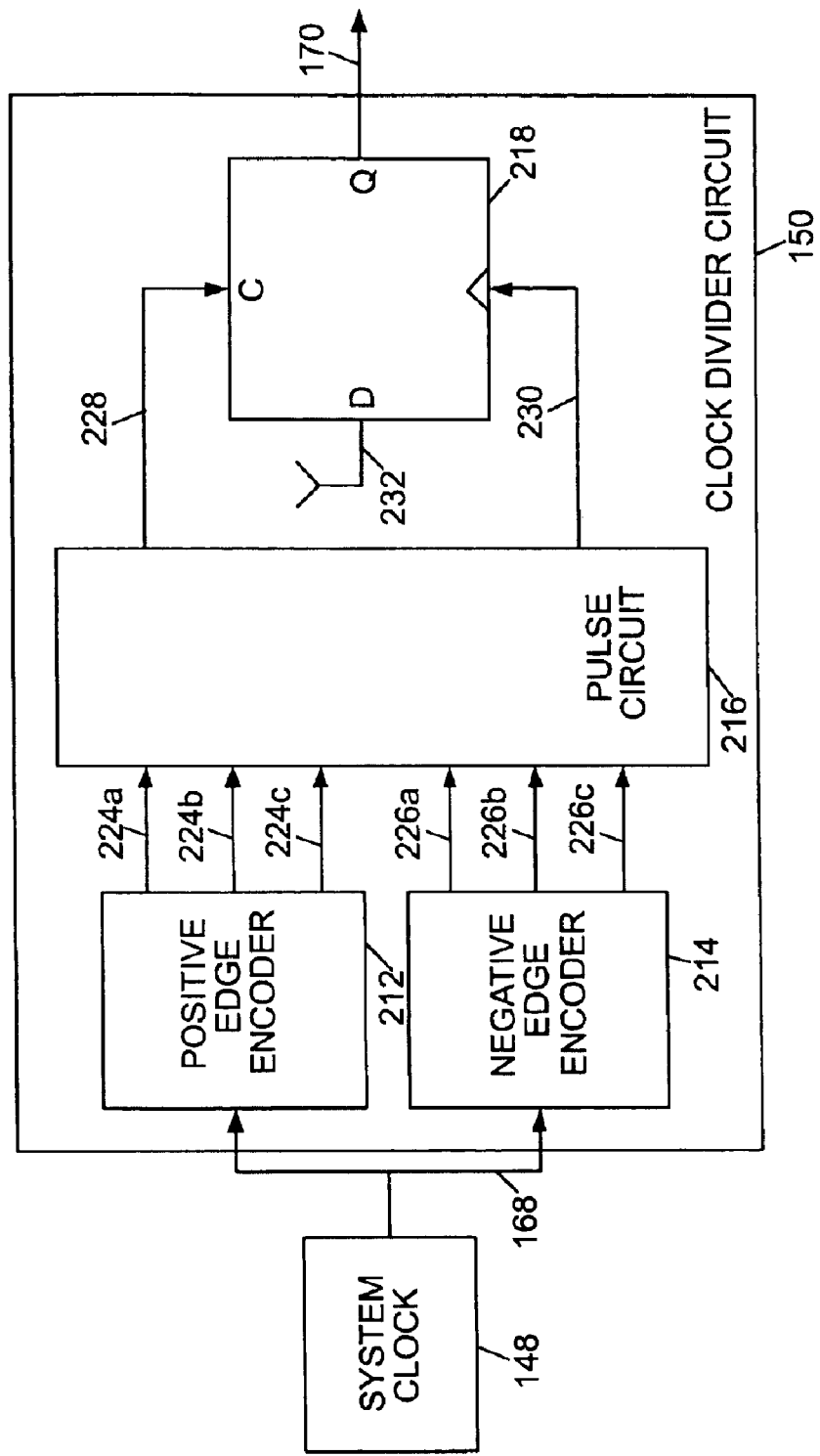
FIG. 2 is a block diagram illustrating an embodiment of a clock divider circuit.

FIG. 2 is a block diagram illustrating additional details of an embodiment of clock divider circuit 150. Clock divider circuit 150 includes a positive edge encoder 212, a negative edge encoder 214, a pulse circuit 216, and a clocked D flip-flop 218. The system clock signal received from system clock 148 is provided to positive edge encoder 212 and negative edge encoder 214 using connection 168. Positive edge encoder 212 generates a set of encoded signals in response to a positive, i.e. rising, edge of the system clock signal and provides this set of signals to pulse circuit 216 using connections 224a, 224b, and 224c. Positive edge encoder 212 may be either a three bit wide ringed shift register or a three bit wide encoder. Negative edge encoder 214 generates a set of encoded signals in response to a negative, i.e. falling, edge of the system clock signal and provides this set of signals to pulse circuit 216 using connections 226a, 226b, and 226c. Negative edge encoder 214 may be either a three bit wide ringed shift register or a three bit wide encoder. Pulse circuit 216 generates a first pulse signal and a second pulse signal in response to the sets of encoded signals and provides the first and second pulse signals to clocked D flip-flop 218 using connections 228 and 230. Connection 228 is coupled to the CLEAR input of clocked D flip-flop 218, and connection 230 is coupled to the CLOCK input of clocked D flip-flop 218. The D input of the clocked D flip-flop 218 is tied high, i.e. set to a logical one or high level. Clocked D flip-flop 218 receives the first and second pulse signals, generates the divided clock signal using the first and second pulse signals, and provides the divided clock signal from the Q output on connection 170.

Figure 4:
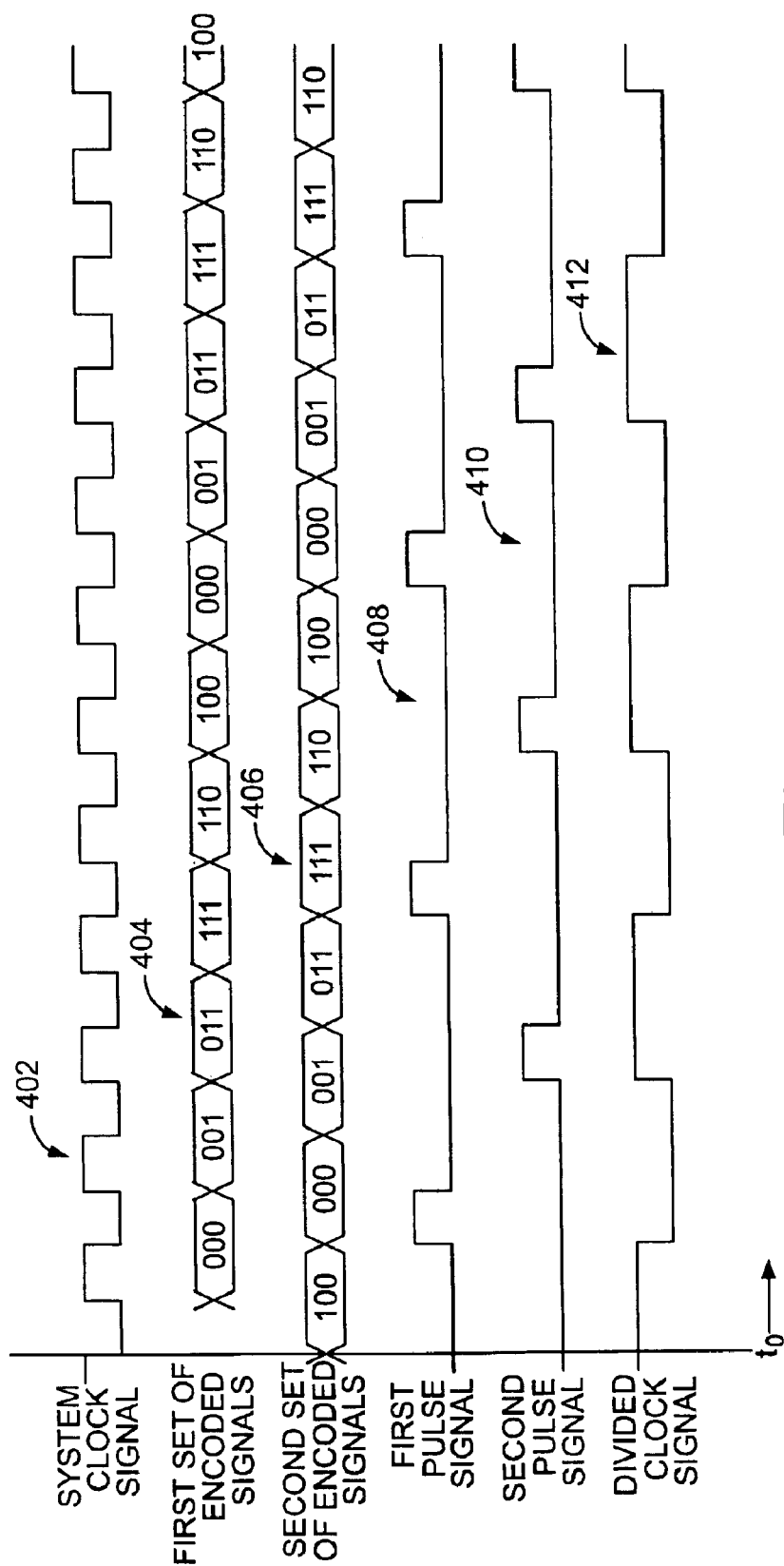
FIG. 4 is a time diagram illustrating an embodiment of signals generated by a clock divider circuit.

FIG. 4 is a time diagram illustrating an embodiment of signals generated by clock divider circuit 150 as shown in FIG. 2. FIG. 4 includes a system clock signal 402, a first set of encoded signals 404, a second set of encoded signals 406, a first pulse signal 408, a second pulse signal 410, and a divided clock signal 412.

Referring to FIGS. 2 and 4, positive edge encoder 212 receives system clock signal 402 from system clock 148 and generates the first set of encoded signals 404. As shown in FIG. 4, the set of encoded signals 404 changes with each positive edge of system clock signal 402. The set of encoded signals 404 begins with 000 and continues in the following sequence in response to the positive edge of system clock signal 402: 001, 011, 111, 110, 100, 000, etc. In the set of encoded signals 404, the most significant bit corresponds to connection 224a, the next most significant bit corresponds to connection 224b, and the least significant bit corresponds to connection 224c.

Negative edge encoder 214 receives system clock signal 402 from system clock 148 and generates the second set of encoded signals 406. The set of encoded signals 406 changes with each negative edge of system clock signal 402. The set of encoded signals 406 begins with 000 and continues in the following sequence in response to the negative edge of system clock signal 402: 001, 011, 111, 110, 100, 000, etc. In the set of encoded signals 406, the most significant bit corresponds to connection 226a, the next most significant bit corresponds to connection 226b, and the least significant bit corresponds to connection 226c.

Figure 3:
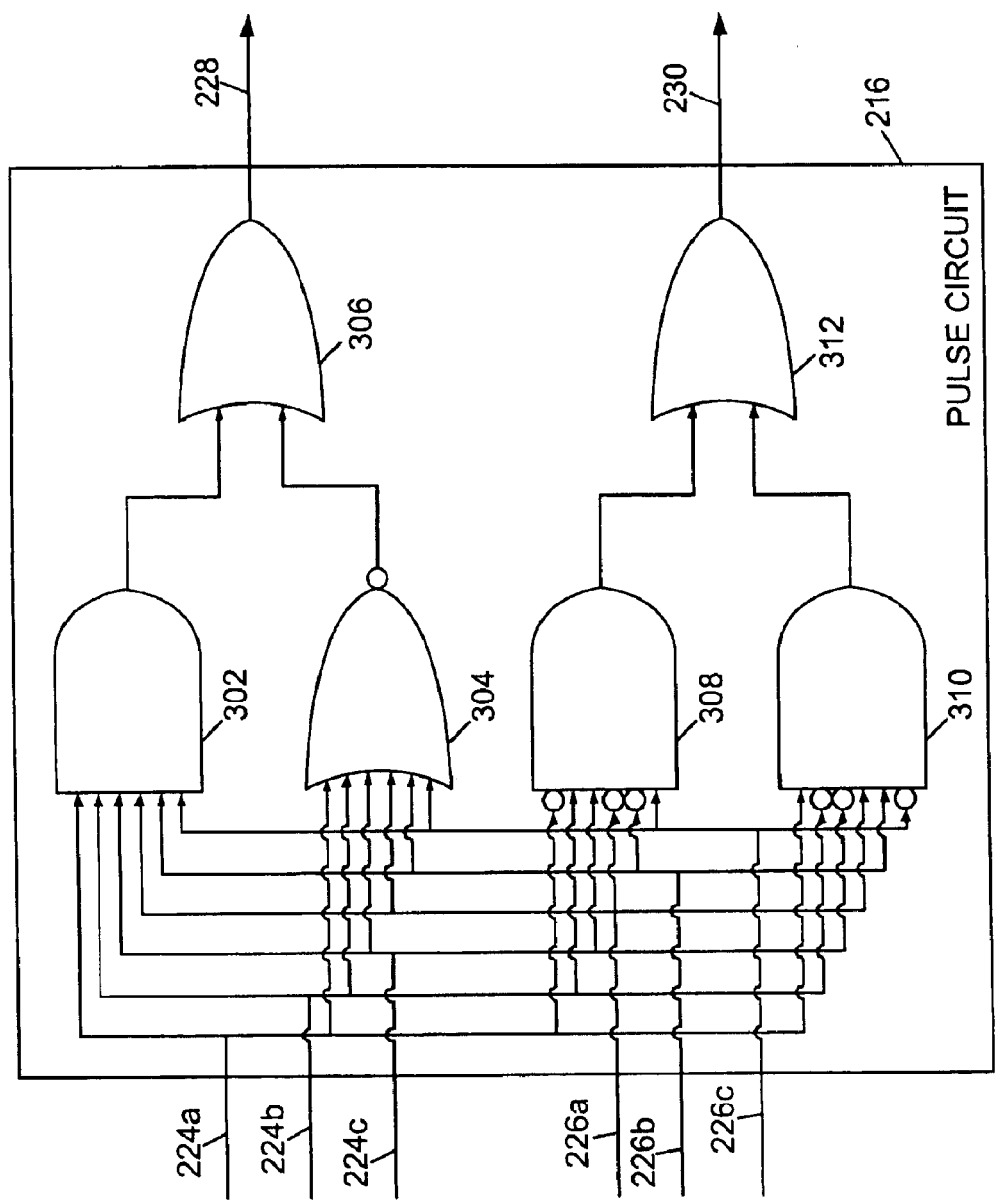
FIG. 3 is a circuit diagram illustrating an embodiment of a pulse circuit.

As shown in FIG. 2, the sets of encoded signals 404 and 406 are provided to pulse circuit 216 using connections 224a, 224b, 224c, 226a, 226b, and 226c. FIG. 3 is a circuit diagram illustrating an embodiment of pulse circuit 216. In FIG. 3, connections 224a, 224b, 224c, 226a, 226b, and 226c are coupled to an AND gate 302, a NOR gate 304, an AND gate 308, and an AND gate 310 as shown. The outputs of AND gate 302 and NOR gate 304 are provided to an OR gate 306 to generate the first pulse signal 408 on connection 228. The outputs of AND gate 308 and AND gate 310 are provided to an OR gate 312 to generate the second pulse signal 410 on connection 230. The circuit in FIG. 3 is shown by way of example as many variations of the circuit using other types and/or numbers of gates with the same or different numbers of inputs to generate the first and second pulse signals are possible.

Referring to FIGS. 2 and 4, the first pulse signal 408 is provided to the CLEAR input of clocked D flip-flop 218, and the second pulse signal 410 is provided to the CLOCK input of clocked D flip-flop 218. With the D input tied high as shown, the divided clock signal 412 is provided by the Q output of clocked D flip-flop 218. Each pulse from the first pulse signal 408 causes the Q output to be cleared, i.e. transition to a logical low level, and each pulse from the second pulse signal causes the high level of the D input to be clocked to the Q output to generate a logical high level. As a result, the divided clock signal 412 has a frequency that is (one divided by three, i.e. ⅓) of the frequency of the system clock signal and has a 50% duty cycle.

Figure 5:
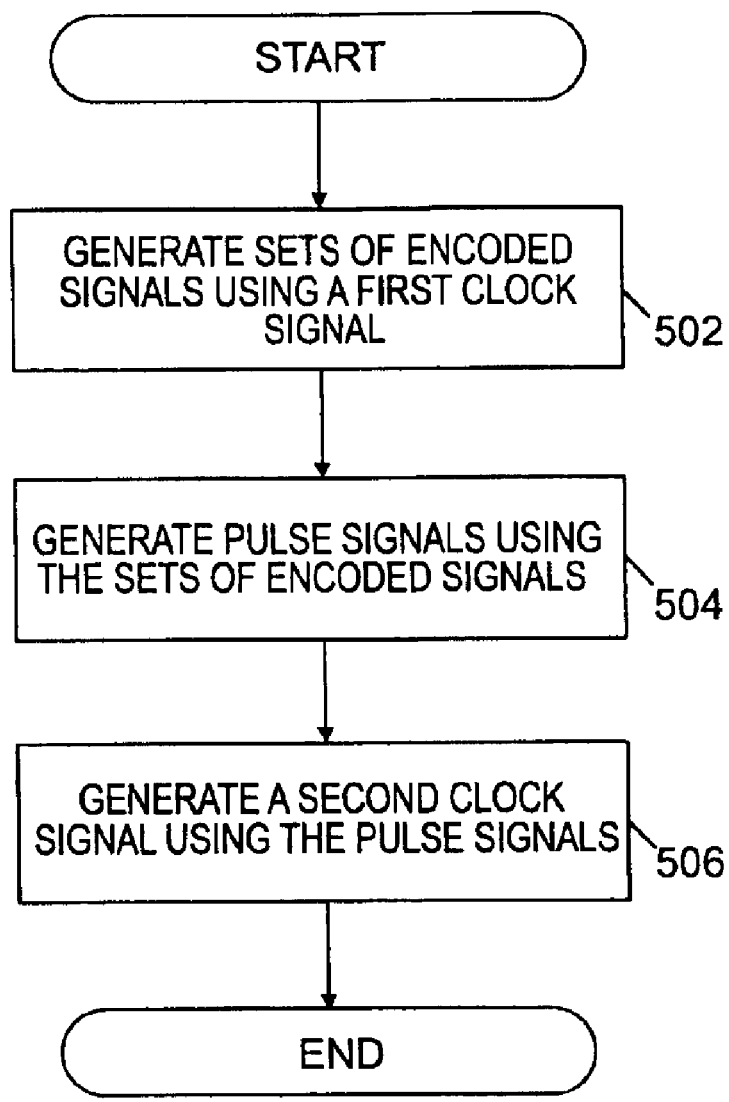
FIG. 5 is a flow chart illustrating an embodiment of a method for generating a divided clock signal.

FIG. 5 is a flow chart illustrating an embodiment of a method for generating a divided clock signal. In FIG. 5, sets of encoded signals are generated using a first clock signal as indicated in a block 502. Two sets of encoded signals may be generated where each of the sets includes a number of signals equal to n where n is an integer greater than or equal to one. The sets of encoded signals may each be generated using a different portion of the first clock signal. For example, a first set may be generated using a positive edge of the first clock signal and a second set may be generated using a negative clock signal. Pulse signals are generated using the sets of encoded signals as indicated in a block 504. Two pulse signals may be generated in response to the sets of encoded signals. A second clock signal is generated using the pulse signals as indicated in a block 506. The second clock signal has a duty cycle of 50% and a frequency of (one divided by n) where n is equal to the number of signals in each of the sets of encoded signals. Accordingly, the second clock signal comprises a divided clock signal. For example, where n is three, the second clock signal has a frequency of ⅓ (one-third) of the frequency of the first clock signal.

Figure 6:
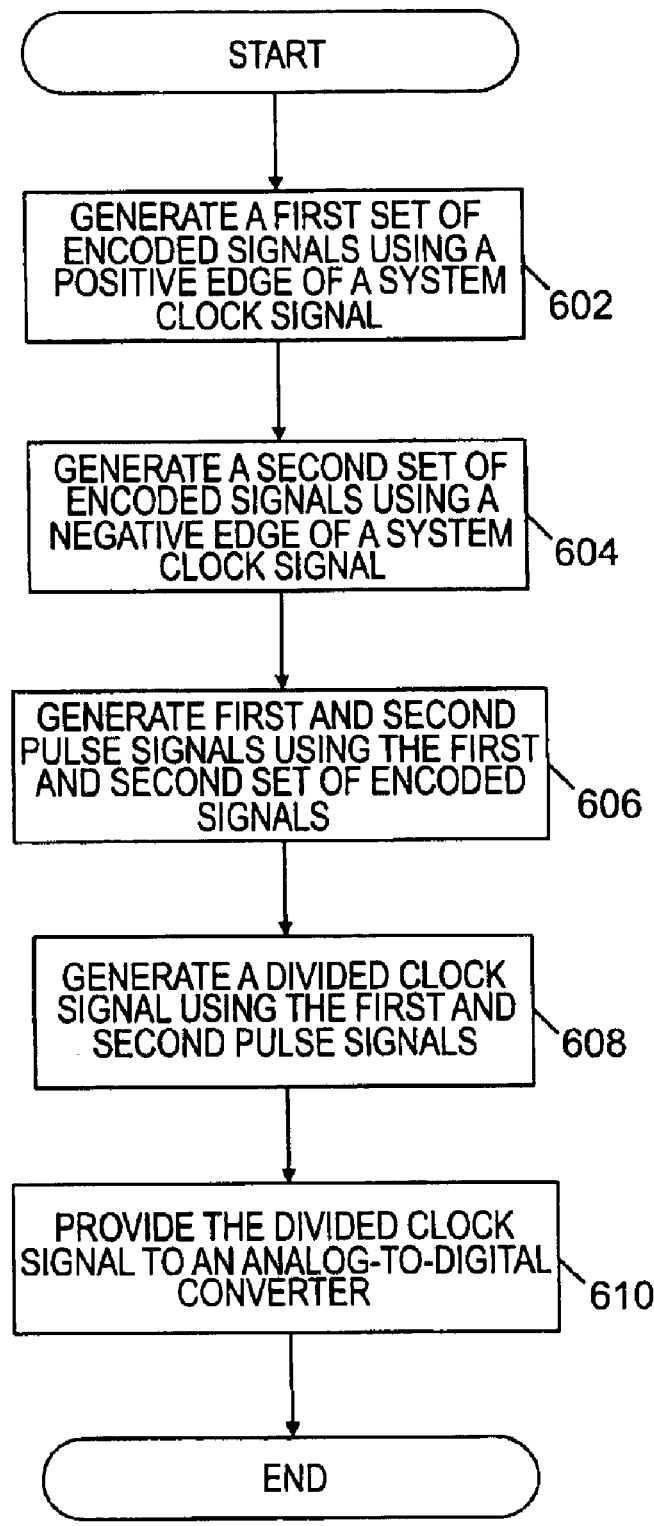
FIG. 6 is a flow chart illustrating an embodiment of a method for generating a divided clock signal in a transceiver.

FIG. 6 is a flow chart illustrating an embodiment of a method for generating a divided clock signal in a transceiver. In FIG. 6, a first set of encoded signals is generated using a positive edge of a system clock as indicated in a block 602. The first set of signals includes a number of signals equal to n where n is an integer greater than or equal to one. A second set of encoded signals is generated using a negative edge of a system clock as indicated in a block 604. The second set of signals includes a number of signals equal to n. First and second pulse signals are generated using the first and second sets of encoded signals as indicated in a block 606. A divided clock signal is generated using the first and second pulse signals as indicated in a block 608. The divided clock signal has a duty cycle of 50% and the frequency of the divided clock signal is (one divided by n) of the frequency of the system clock signal. The divided clock signal is provided to an analog-to-digital converter as indicated in a block 610.

Figure 7:
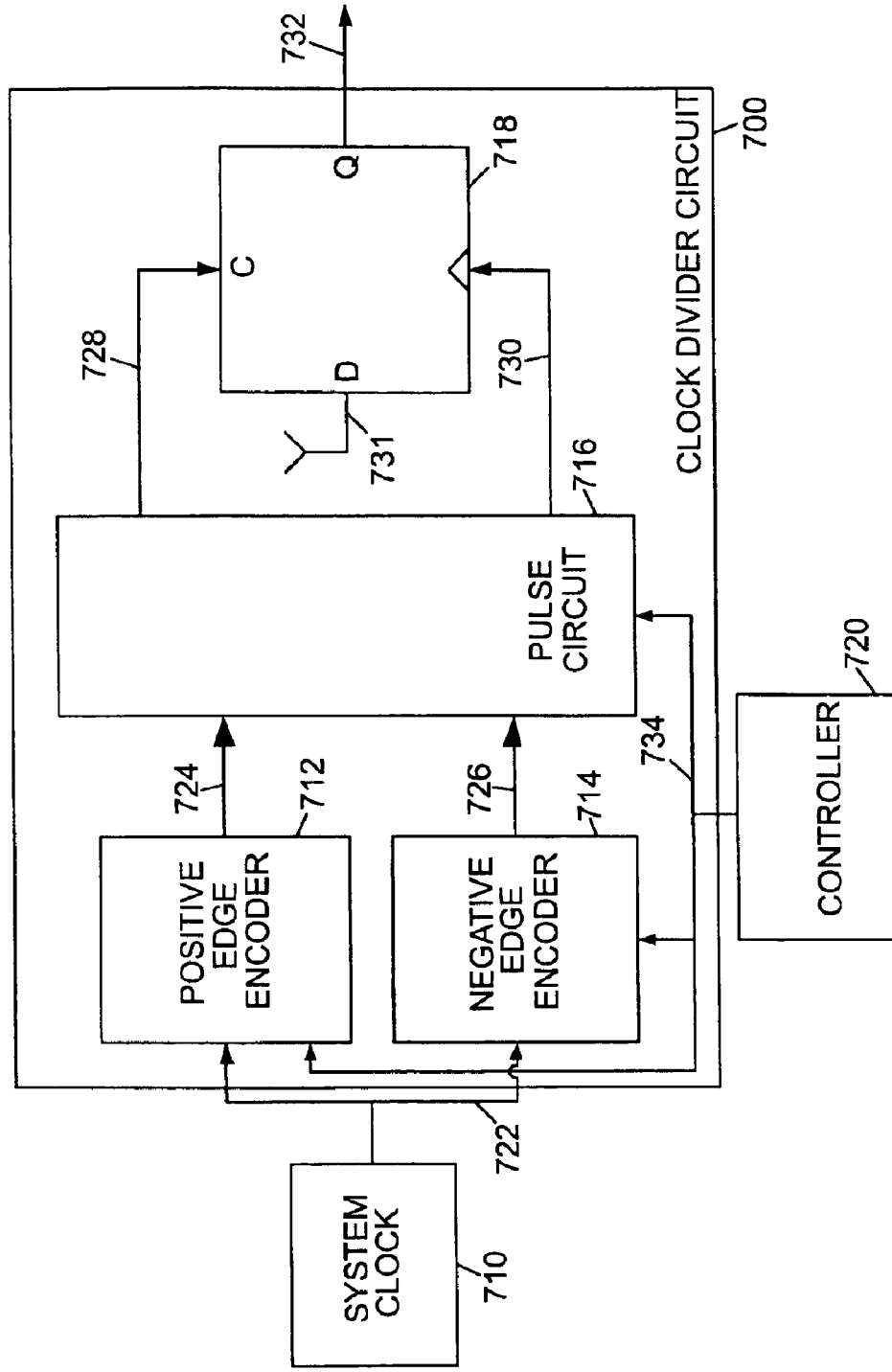
FIG. 7 is a block diagram illustrating an embodiment of a programmable clock divider circuit.

FIG. 7 is a block diagram illustrating an embodiment of a programmable clock divider circuit 700 coupled to a system clock 710 and a controller 720. Clock divider circuit 700 includes a positive edge encoder 712, a negative edge encoder 714, a pulse circuit 716, and a clocked D flip-flop 718. A system clock signal is received from system clock 710 and is provided to positive edge encoder 712 and negative edge encoder 714 using a connection 722. Positive edge encoder 712 generates a set of encoded signals in response to a positive, i.e. rising, edge of the system clock signal and provides this set of signals to pulse circuit 716 using a set of connections 724. Positive edge encoder 712 may be either an n bit wide ringed shift register or an n bit bit wide encoder where n is an integer greater than or equal to one. Negative edge encoder 714 generates a set of encoded signals in response to a negative, i.e. falling, edge of the system clock signal and provides this set of signals to pulse circuit 716 using a set of connections 726. Negative edge encoder 714 may be either an n bit wide ringed shift register or an n bit wide encoder where n is an integer greater than or equal to one. Pulse circuit 716 generates a first pulse signal and a second pulse signal in response to the sets of encoded signals and provides the first and second pulse signals to clocked D flip-flop 718 using connections 728 and 730. Connection 728 is coupled to the CLEAR input of clocked D flip-flop 718, and connection 730 is coupled to the CLOCK input of clocked D flip-flop 718. The D input of the clocked D flip-flop 718 is tied high, i.e. set to a logical one or high level, as indicated by a symbol 731. Clocked D flip-flop 718 receives the first and second pulse signals, generates the divided clock signal using the first and second pulse signals, and provides the divided clock signal from the Q output on connection 732.

Clock divider circuit 700 comprises a programmable clock divider circuit configured to receive a clock divide signal from controller 720. In response to the clock divide signal, clock divider circuit 700 causes the divided clock signal to have a frequency that is (one divided by n) of the frequency of the system clock signal where n is an integer greater than or equal to one and is determined according to the clock divide signal. In particular, the clock divide signal provided by controller 720 to clock divider circuit 700 causes the frequency of the divided clock signal to be set.

Controller 720 either stores or accesses information used to generate the clock divide signal. The clock divide signal indicates the integer n that determines the frequency of the divided clock signal. Controller 720 generates the clock divide signal and provides the clock divide signal to positive edge encoder 712, negative edge encoder 714, and pulse circuit 716 using a connection 734.

In response to the clock divide signal, positive edge encoder 712 generates a first set of encoded signals. The first set of encoded signals includes a number of signals equal to the value of n indicated by the clock divide signal. Similarly, in response to the clock divide signal, negative edge encoder 714 generates a second set of encoded signals. The second set of encoded signals includes a number of signals equal to the value of n indicated by the clock divide signal. For example, where the clock divide signal indicates that n is five, the first and second sets of encoded signals will each include five signals.

In response to the clock divide signal and the first and second sets of encoded signals, pulse circuit 716 generates the first and second pulse signals and provides the first and second pulse signals to clocked D flip-flop 718. Similar to the embodiment of FIG. 2 as described above, clocked D flip-flop 718 generates the divided clock signal in response to the first and second pulse signals such that the divided clock signal has a frequency of (one divided by n) of the frequency of the system clock signal. Accordingly, where the clock divide signal indicates that n is five, for example, the divided clock signal will have a frequency of ⅕ (one-fifth) of the system clock signal and a duty cycle of 50%.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A transceiver comprising:

a system clock configured to generate a first clock signal;

a clock circuit configured to receive the first clock signal and configured to generate a second clock signal, wherein the second clock signal has a frequency of (one divided by n) of a frequency of the first clock signal, wherein n is an integer greater than or equal to one;

an analog-to-digital converter configured to receive the second clock signal; and a transmitter coupled to the A/D converter and configured to receive digital output signals and configured to generate optical output signals in response to the digital output signals.

2. The transceiver of claim 1 wherein n is an odd integer greater than one.

3. The transceiver of claim 1 wherein the analog-to-digital converter comprises a sigma-delta modulator.

4. The transceiver of claim 1 wherein the transmitter includes the system clock, the clock circuit, and the analog-to-digital converter.

5. The transceiver of claims 1 further comprising:

a controller coupled to the transmitter;

wherein the transmitter includes:

a laser configured to generate the optical output signals; and a monitoring circuit configured to provide analog signals associated with the laser to the analog-to-digital converter;

wherein the analog-to-digital converter is configured to provide digital signals to the controller in response to the analog signals, and wherein the controller is configured to provide control signals to the laser in response to the digital signals.

6. The transceiver of claim 5 wherein the monitoring circuit includes a PIN photo diode and an amplifier.

7. The transceiver of claim 1 further comprising:

a controller configured to provide control signals to the transmitter and a receiver.

8. The transceiver of claim 7 further comprising:

the receiver configured to receive optical input signals and configured to generate digital input signals in response to the optical input signals.

9. The transceiver of claim 7 the controller is configured to provide a clock divide signal to the clock circuit, and wherein the clock divide signal indicates the integer n.

10. The transceiver of claim 1 wherein the clock circuit includes:

a first circuit configured to receive the first clock signal and generate a first set of encoded signals in response to a positive edge of the first clock signal;

a second circuit configured to receive the first clock signal and configured to generate a second set of encoded signals in response to a negative edge of the first clock signal;

a third circuit configured to receive the first set of encoded signals and the second set of encoded signals and configured to generate a first pulse signal and a second pulse signal in response to the first set of encoded signals and the second set of encoded signals; and a fourth circuit configured to receive the first pulse signal and the second pulse signal, and configured to generate the second clock signal in response to the first pulse signal and the second pulse signal.

11. The transceiver of claim 10 wherein the first circuit comprises a first ringed shift register, and wherein the second circuit comprises a second ringed shift register.

12. The transceiver of claim 10 wherein the first circuit comprises a first encoder, and wherein the second circuit comprises a second encoder.

13. The transceiver of claim 10 wherein the first set of encoded signals and the second set of encoded signals each include three encoded signals, and wherein the second clock signal has a frequency that is one-third of a frequency of the first clock signal.

14. The transceiver of claim 10 wherein the fourth circuit comprises a clocked D flip-flop.

15. The transceiver of claim 14 wherein the first pulse signal is provided to a clear input of the clocked D flip-flop, wherein the second pulse signal is provided to a clock input of the clocked D flip-flop, wherein a D input of the clocked D flip-flop is tied high, and wherein the second clock signal is provided from a Q output of the clocked D flip-flop.

* * * * *